United States Patent Office 2,874,380
Patented Feb. 17, 1959

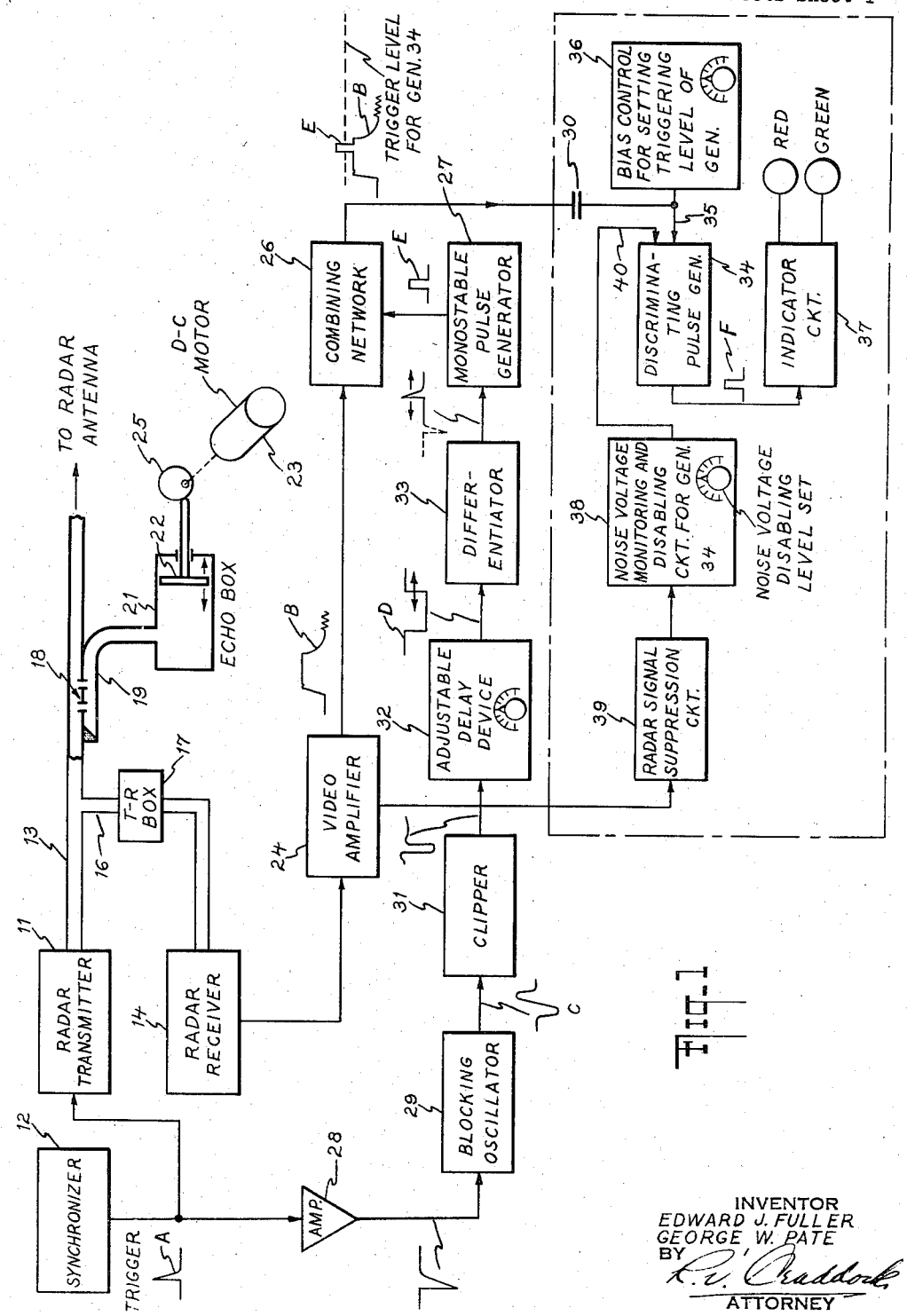

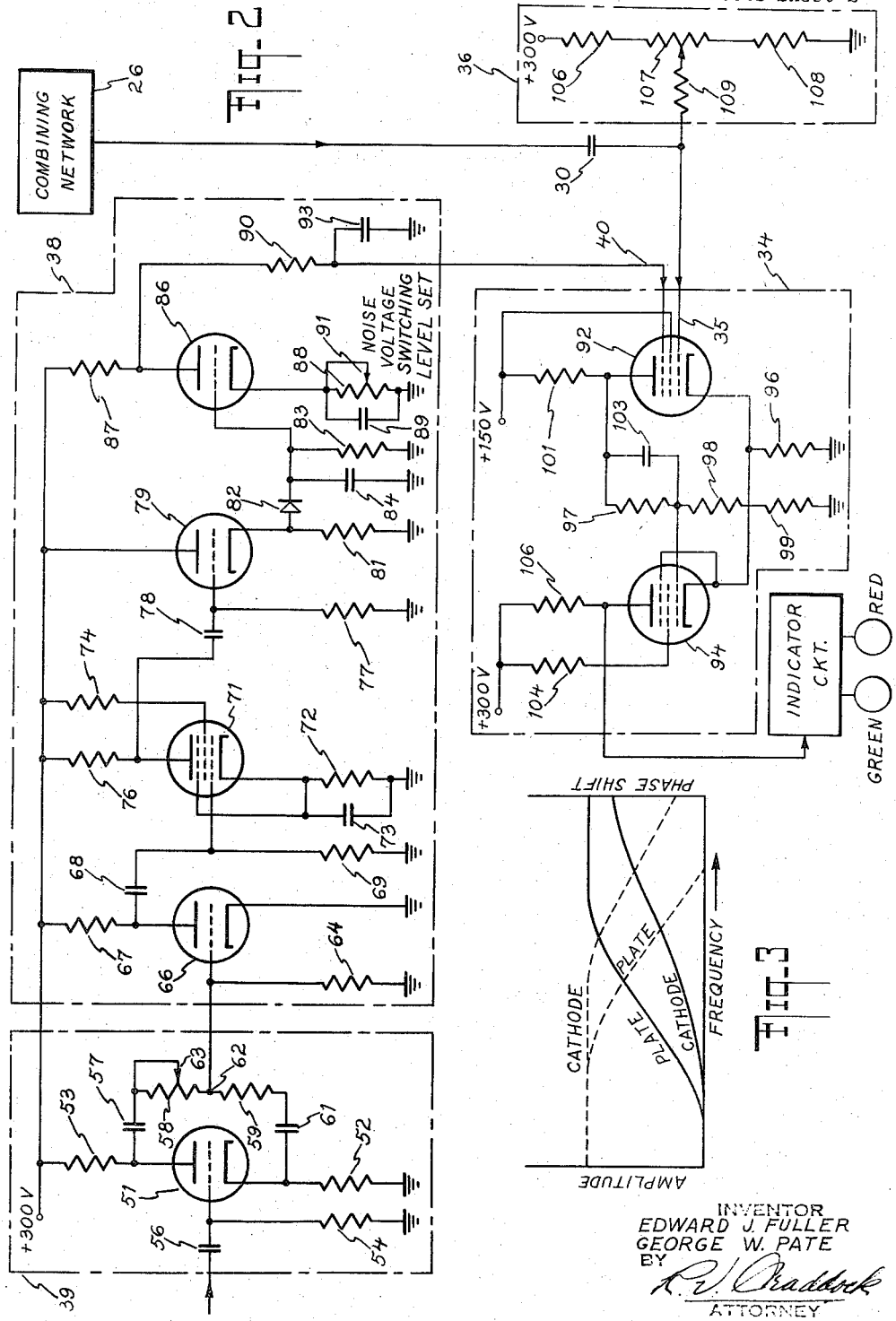

2,874,380

RADAR SYSTEM EVALUATOR

Edward J. Fuller, Garden City, and George W. Pate, Wantagh, N. Y., assignors to Sperry Rand Corporation, a corporation of Delaware Application July 12, 1956, Serial No. 597,504

16 Claims. (Cl. 343—17.1)

The present invention relates to evaluator apparatus for ascertaining the operating performance of pulse radar systems.

One radar test device previously proposed is comprised of means for providing a go-no-go type of indication of a pulse radar system's performance with receiver gain, alignment and transmitter power comprising factors determining what indication is provided. In such a device, energy derived from detected signals from the radar receiver to be tested, the receiver being responsive to the output from an echo box energized by the transmitter of the radar system under test, is compared with test pulses which have been delayed by a predetermined amount from trigger pulses for the radar system. The width of each detected pulse signal from the receiver is indicative of the gain and frequency alignment of the receiver and the power delivered by the transmitter of the radar system being tested.

If each detected pulse signal from the radar receiver is sufficiently wide so that a predetermined point at the beginning of its decaying trailing edge, for example, occurs after a delayed test pulse occurring during the detected pulse signal, it is an indication that the radar system is operating satisfactorily as to receiver gain, alignment and transmitter power output. If such a point occurs prior to a test pulse produced in response to the same trigger pulse for the transmitted pulse from which a detected signal is derived, it is an indication of faulty radar system performance. Such a system is disclosed in copending U. S. patent application Serial No. 542,349, filed on October 24, 1955, by T. H. O'Brien and E. J. Fuller and assigned to the same assignee as the present application.

A test device as aforedescribed is suitable for providing a rapid automatic indication of the suitability or non-suitability of receiver gain, alignment and transmitter power output of a pulse radar system. Sometimes, however, it would be desirable to provide such a device which would automatically take into consideration the noise level from the receiver so that if it became too high an indication would be provided that the radar system is operating unsatisfactorily, even though receiver gain, alignment and transmitter power may be above minimum requirements.

Therefore, it is an object of the present invention to provide a radar system evaluator for automatically providing an accurate indication of whether or not the noise level of detected energy from a radar receiver is below or above certain requirements therefor.

It is a further object to provide a radar system evaluator which provides a first predetermined indication when the combined factors of receiver gain, alignment, transmitter power and the noise level of energy detected by the receiver of the radar system simultaneously meet or attain certain requirements set for the system and a second predetermined indication whenever one or more of said requirements are not attained in the radar system.

The foregoing and other objects and advantages of the present invention are obtained by means for combining test voltage pulses delayed by a predetermined amount from trigger pulses for the radar system being tested with further voltage pulses derived from detected video pulses from the radar receiver after response to a signal output from an echo box energized by pulses of energy from the radar system. A pulse voltage output from the combining means is fed into a first circuit of discriminating generator apparatus which is adapted for a predetermined operation only during a time when the level of the noise energy at the output of the radar receiver is below a predetermined minimum. During such a time, if the aforementioned voltage output from the combining means is above a predetermined level as a result of adequate receiver gain, alignment and transmitter power, information will be provided by the discriminating generator apparatus that the system is operating satisfactorily. If the aforementioned level of the voltage output from the combining means is too low, as would occur when the pulse width of the detected video pulses is too narrow, information is provided that the combined transmitter-receiver performance of the radar system is unsatisfactory. Means are provided for response to noise voltage components of energy at the output of the radar receiver for disabling the discriminating generator apparatus during any time when the level of the noise energy rises above a predetermined value, disabling being effected regardless of the output from the combining means during an evaluation of the radar system.

Referring to the drawings,

Fig. 1 is a schematic block diagram of the radar system evaluator of the present invention in combination with a pulse radar system to be tested;

Fig. 2 is a schematic wiring diagram of a part of the system in Fig. 1 enclosed by the dashed line enclosure in Fig. 1; and Fig. 3 is a graph for illustrating the operation of the radar signal suppression circuit shown in Figs. 1 and 2.

Referring to Fig. 1, the block designated by numeral 11 represents a radar transmitter of electromagnetic energy for providing a series of regularly recurrent microwave pulses at a repetition rate determined by a series of trigger pulses from a radar synchronizer 12. The output from transmitter 11 is adapted to be supplied to a microwave radar antenna, not shown, by an electromagnetic wave guide 13. The wave guide 13 comprises a common path for transmitter energy and reflected energy from distant objects from the antenna, the reflected energy being transferred from wave guide 13 to a radar receiver 14 by a wave guide 16 serially connected to wave guide 13. Wave guide 16 includes a conventional TR box 17 for blocking transmitter energy from the radar receiver 14 and providing an efficient transfer of received echo energy to the receiver 14. The aforedescribed components comprise a conventional pulse radar system whose operation is evaluated by utilizing the remaining components illustrated in Fig. 1.

A directional coupler 18 is provided along the wave guide 13 between the wave guide 16 and the radar antenna for sampling a small portion of the transmitted pulse energy and supplying this portion by way of a wave guide 19 to an electromagnetic energy echo box 21. The echo box 21 comprises a high-Q resonant cavity. It is adapted to receive the aforementioned portion of transmitted energy and, when tuned to the carrier frequency of the energy produced by radar transmitter 11, reradiates energy back into the wave guide 13 via directional coupler 18 for transmission back to the receiver 14 through the TR box 17 and wave guide 16. The length of time that the echo box 21 oscillates or rings before decaying into the noise level after each transmitter pulse is dependent on its tuning, losses in the echo box, and the shape and peak power of the pulses from transmitter 11.

A plunger is provided as an adjustable end wall within the echo box 21 for tuning thereof. A motor 23 is coupled to the plunger 22 by suitable cam means 25 for reciprocally moving plunger 22 back and forth for slowly sweeping the echo box frequency over a predetermined range of frequencies known to include the carrier frequency of the pulse energy from transmitter 11. The motor 23 is turned on when the radar system is to be tested so that the radar operator does not have to be concerned with tuning the test equipment to the exact frequency of the radar system. If it is desirable to manually adjust the tuning of the echo box 21 to a fixed frequency corresponding to the carrier frequency of energy from transmitter 11, motor 23 could be omitted.

The reradiated echo box microwave energy is sent back to the receiver 14 for amplification, conversion to an intermediate frequency, detection for providing a video pulse waveform, and additional amplification in a form of level compression or limiting. Each detected video output pulse signal from the receiver 14 will have a substantially flat top as a result of the aforementioned level compression or limiting with an exponentially decaying trailing edge. Since the ring time of the echo box 21 and decay times of echo box pulses applied to the receiver 14 are functions of transmitter peak power, the duration of the flat tops of the detected pulse signals from receiver 14 are related to transmitter performance, decreasing when the peak power of the transmitted pulses decreases. The duration of the flat top of each detected pulse signal from receiver 14 is also a function of receiver performance, decreasing with a reduction in receiver gain and for receiver frequency alignment. If the receiver contains a local oscillator, for example, whose frequency is not separated from the transmitter frequency by the required intermediate frequency the width of the video output pulses from the receiver decrease from what they would be when the receiver local oscillator is properly tuned. A certain amount of noise energy also accompanies the detected signals at the output of receiver 14, the noise being produced by certain components in the receiver 14 and reflections from random targets energized by energy from the radar antenna during a test.

The video pulse signal output from receiver 14 is supplied to an input video amplifier 24 of the evaluator for further amplification. If for some reason the radar receiver 14 is not of a type which includes a video limiting circuit, the video amplifier 24 must be modified to limit the detected output of the receiver 14. Modifications must also be made for receivers having FTC (fast time constant) or inductance differentiation and/or any other type of anti-clutter circuits. In any event, whenever the echo box 21 is resonant to energy from transmitter 11 the amplified detected video pulses from amplifier 24 should appear as pulses having the shape of pulse B shown at the output of amplifier 24 in Fig. 1 so that the duration of the flat top thereof is directly related to receiver gain, alignment and transmitter power output.

The output from amplifier 24 is supplied to a first input of a voltage combining means or network 26 having a second input coupled to a monostable pulse generator 27 whose function will be described further below. The network 26 might comprise a pair of resistors for adding voltage waveforms from two different sources, for example, such networks being well known in the art.

The output from the radar synchronizer 12 comprises a series of regularly recurrent trigger pulses of positive polarity, one of said pulses being shown as pulse A in Fig. 1. This series of trigger pulses, besides being supplied to the radar transmitter 11 for triggering, is supplied to the input of an amplifier 28 whose pulse output is of negative polarity for triggering a blocking oscillator circuit 29. The output from circuit 29 should comprise pulses of substantially constant duration having a negative and then a positive going portion after each trigger pulse from the synchronizer 12 of positive polarity, for example. One of these pulses is shown as pulse C in Fig. 1. If desired, amplifier 28 might include suitable switch means for rendering it responsive to produce negative output pulses in response to negative rather than positive input trigger pulses, the switch means being adapted to supply the negative input trigger pulses to the cathode of an input tube of amplifier 28 rather than the grid of such a tube.

The output from the blocking oscillator 29, which is a monostable oscillator responsive to negative trigger pulses, is supplied to the input of a clipper 31 for clipping the positive half of each pulse received thereby. The rectified output pulses from clipper 31, which comprises a diode, for example, are supplied as negative trigger pulses to adjustable delay means 32 such as a monostable delay multivibrator or phantastron.

The delay means 32 contains an adjustable RC timing circuit, not shown, for providing a pulse output of desired width determined by the timing circuit included in means 32. The output from the delay means 32 comprises a pulse such as D in Fig. 1 for each trigger pulse from synchronizer 12, and is supplied to a differentiator 33 for providing two pulses of opposite polarity at the leading and trailing edges, respectively, of each output pulse D from the delay means 32. As indicated in Fig. 1, the trailing edge of each pulse D can be changed in time as a function of the delay provided by device 32. Consequently, the timing of each positive pulse from differentiator 33 in correspondence with the trailing edge of each pulse D is regulatable.

The pulse output from the differentiator 33 is supplied to the monostable pulse generator 27, which is adapted to be triggered only by positive going pulses from differentiator 33. The pulse generator 27, which comprises a relaxation oscillator such as a thyratron circuit having a delay line combined therewith in a conventional manner for providing an output pulse such as pulse E of predetermined fixed duration for each trigger supplied thereto, is provided for supplying delayed voltage pulses of very accurate amplitude and duration to the combining network 26. The delayed voltage pulses from generator 27 are supplied to network 26 for addition with the detected video pulse voltages B from amplifier 24, the pulses E being preferably of the order of duration of the output pulses from transmitter 11.

As should be clear from above, the pulses at the output of generator 27 are delayed from the synchronizing pulses from synchronizer 12, the delay being a function of the state of adjustment of the delay means 32. The delay provided by the device 32 is chosen so that a pulse E will ride on top of and at the right hand end of the flat top of each detected video pulse B at the output of amplifier 24 when the combined performance of the radar transmitter 11 and receiver 14 relating to transmitter peak power, receiver gain and frequency alignment is just at a minimum. If the radar system operates above such a minimum, the duration of the flat top of a pulse B is large enough so that its decaying trailing edge occurs well beyond a delayed pulse E derived in response to a radar system trigger pulse in correspondence with a pulse B. Such a pulse is shown as compound pulse B—E at the output of network 26 in Fig. 1.

The output of the combining network 26 is supplied through capacitor 30 to a first input 35 of a discriminating pulse generator 34. A voltage derived by means which will be described further below is applied to a second input 40 of generator 34 for conditioning the generator for operation whenever the level of noise energy at the output of radar receiver 14 is below a certain level. If during a test of the radar system the noise level is below such a minimum, generator 34 will produce a rectangular pulse such as pulse F indicated in Fig. 1 at the generator output whenever it receives a pulse such as the pulse B—E in Fig. 1 from the combining network 26 having a combined peak amplitude larger than a predetermined minimum value.

The pulse generator 34, which comprises a multivibrator, for example, contains a multi-grid input tube, not shown in Fig. 1, the input tube being cut off during the quiescent state of the generator 34. A bias control 36 is coupled to the input 35 of the generator 34 for regulating the level of magnitude for the triggering voltage from network 26 required to trigger the generator 34.

Whenever the combined pulses B and E are such that a pulse E rides on the flat top of a pulse B so that the combined peak of the compound pulse B—E is above a certain level as indicated in Fig. 1, for example, the pulse generator 34 is triggered and provides an output pulse F. The foregoing is predicated on the fact that generator 34 is not disabled by too large a noise signal applied to lead 40, and is otherwise conditioned for operation. Output pulses from generator 34 are adapted to trigger an indicator circuit 37, turning on a green lamp thereof for indicating satisfactory radar system performance. If receiver gain, frequency alignment and/or transmitted power in the radar system deteriorate by an undesired amount, the pulses B at the output of the video amplifier 24 will become narrower. Thus, a delayed pulse E at the output of generator 27 will fall on or after the decaying trailing edge of the pulse B so that the pulse output from network 26 is not of sufficient amplitude for triggering generator 34. The indicator circuit 37 should respond at such a time to turn on a red warning lamp thereof when recurrent pulses F are not provided at the output of generator 34.

The indicator 37 may comprise any suitable means known in the art for performing the above-mentioned functions. When the radar system evaluator is off, neither the red nor the green indicator lamps should light. When the evaluator is turned on and connected for testing the operation of a radar system, the green lamp of the indicator 37 should light, at least periodically, in response to a recurrent series of pulses provided at the output of generator 34. When no such pulses are produced, the red lamp of indicator 37 should light. One suitable indicator system for performing such a function is described in the aforementioned copending U. S. application Serial No. 542,349.

In order to make the system sensitive to the noise level response at the output of radar receiver 14, a video signal output from the amplifier 24 is coupled to the input of a radar signal suppression circuit 39. This output is derived from a first amplifying stage of amplifier 24, the other output of amplifier 24 supplied to network 26 being from a second amplifying stage, for example. The circuit 39 is adapted to suppress the frequency components of the detected video pulse energy from amplifier 24 while passing the noise components of energy at higher frequencies which accompanies the video pulse energy.

The noise energy from the circuit 39 is supplied to a noise voltage monitor and disabling circuit 38 for producing a D.-C. output voltage signal proportional to the level of the noise energy derived from circuit 39. Whenever the signal output from the circuit 38 applied to input 40 of generator 34 is above a predetermined magnitude, it causes the generator 34 to be disabled so that it cannot produce output pulses such as pulse F even though trigger pulses from the combining network 26 are above the required amplitude level for triggering. Whenever the noise level is below such a level, the generator 34 is in condition by proper circuit design for triggering by pulses from network 26. The details of operation of this part of the system may be better understood by referring to the schematic circuit details in Fig. 2 of the portion of the block diagram in Fig. 1 enclosed by the dashed line.

Referring now to Fig. 2, the radar signal suppression device 39, which is essentially a bridge circuit, includes a triode tube 51, which in one operative system comprises one half of a 12AU7 twin triode having its cathode coupled to ground through resistor 52 and its plate coupled to a suitable source of B+ operating voltage through a plate resistor 53. Resistor 53 preferably has the same resistance value as cathode resistor 52. The input to the grid of tube 51 is supplied with detected output pulses from the video amplifier 24 of Fig. 1 through a conventional RC coupling network comprising resistor 54 and capacitor 56. The plate and cathode of tube 51 are coupled together by means of a series circuit comprising capacitor 57, resistors 58, 59 and capacitor 61. The capacitors 57, 61 preferably have the same value of capacitance with the resistors 58, 59 having the same value of resistance. The resistors 52 and 53 should be of relatively low resistance value such as five kilohms, for example, resistors 58 and 59 being ten kilohms each with capacitors 57, 61 being .01 microfarad each in one circuit which has been constructed and successfully operated, for example.

A differential output is obtained in the circuit 39 from the junction 62 between resistors 58 and 59. An adjustable tap 63 is connected between capacitor 57 and any desired point along resistor 58 for equalizing the video pulse signal voltages at the outputs of tube 51 between junction 62 and the plate of tube 51 and between junction 62 and the cathode of tube 51. Thus, the bridge-type circuit 39 can be readily balanced for video pulse signal voltages.

The tube 51 has a substantially constant amplitude versus frequency and phase shaft versus frequency response at lower frequencies in the cathode and plate circuits thereof. At higher frequencies, each of the aforementioned responses becomes different from each other since the plate to grid and cathode to grid interelectrode capacitances are not the same and capacitance exists between the heater (not shown) and cathode of tube 51 which does not exist in the plate circuit. The bridge circuit 39 is, therefore, readily balanced at low frequencies where the capacitive reactances are high so as not to have any unbalancing effect on the bridge. At higher frequencies, the aforementioned capacitive reactances in the plate and cathode circuits of tube 51 decrease, and, since the aforementioned capacitances are unequal, different responses occur in the plate and cathode circuits of the tube.

The two dashed line curves in Fig. 3 represent the amplitude versus frequency response for the plate and cathode circuits of tube 51 while the solid line curves represent the plate and cathode phase shift versus frequency responses of tube 51. These curves are not to scale and are only for explanatory purposes. The circuit 39 is designed so that the frequency components of the video pulse signals supplied thereto occur within a frequency region whereat the amplitudes of the signals in the plate and cathode circuits of tube 51 are substantially the same and the phase shifts are equal. This will be the case even though the frequency components of the video energy are changed in response to changes in ring time of the echo box 21 energizing the radar receiver.

The frequency spectrum of noise energy accompanying the video pulses supplied to the tube 51 extends through and beyond the frequency band of the tube. Thus, it can be seen that at the upper end of the frequency band and beyond, the plate and cathode waveforms for noise energy at the junction 62 will not cancel each other at junction 62. A differential voltage at noise frequencies is, therefore, provided between junction 62 and ground for application to the noise voltage monitoring circuit 38. The magnitude of the net differential noise voltage signal is a direct function of the level of the noise energy at the higher frequencies and provides an indication of the overall noise level of energy accompanying the video pulses B independently of transmitter power output.

The noise energy signal at the junction 62 in the circuit 39 is supplied by a resistor 64 coupled to the grid of noise amplifier tube 66 for amplification. The amplifier tube 66 comprises a conventional triode having a grounded cathode and a plate resistor 67 coupled to a suitable B+ operating supply. In the circuit wherein the tube 51 comprises one half of a twin triode, the tube 66 comprised the other half of such a tube. The output at the plate of the amplifier tube 66 is supplied through a RC coupling network comprising resistor 69 and capacitor 68 to the grid of a pentode amplifier tube 71.

A resistor 72 bypassed by a capacitor 73 at the noise frequencies couples the cathode of tube 71 to ground. The suppressor grid of tube 71 is coupled to the cathode as illustrated in Fig. 2 with the screen grid being coupled to a suitable B+ source of operating voltage through a resistor 74. A plate resistor 76 is connected to the same B+ operating source. The pentode amplifier tube 71 and associated circuitry is conventional in the art. The output at the plate of the tube 71 is supplied through an RC coupling circuit comprising resistor 77 and capacitor 78 to the grid of a further triode tube 79

The tube 79 is connected as a cathode follower with its cathode being coupled to ground through load resistor 81 and its plate coupled directly to a suitable source of B+ operating voltage supply. A rectifier 82 is connected to the cathode of tube 79 for producing a rectified version of the cathode voltage signal of tube 81, the rectified voltage being supplied through an RC smoothing network comprising parallel connected resistor 83 and capacitor 84. The output from smoothing network 83, 84 is applied to the grid of a D.-C. amplifier tube 86. The cathode follower tube 79 is employed between the amplifier tube 71 and the detector 82 for providing a proper impedance match.

The amplifier tube 86 comprises a triode whose plate is coupled to a B+ source of operating voltage through a load resistor 87 as illustrated in Fig. 2. The cathode of the triode tube 86 is coupled to ground through a resistor 88 bypassed for high frequencies by a capacitor 89. An adjustable contact 91 is provided between the cathode of tube 86 and a point along resistor 88 for setting the quiescent operating potential at the plate of tube 86 to a desired level as will be explained further below.

The plate of the triode 86 is coupled by a large resistor 90 and input lead 40 to the suppressor grid of an input pentode tube 92 of the pulse generator 34. A bypass capacitor 93 is provided between ground and the junction between the aforementioned suppressor grid of tube 92 for preventing any A. C. voltages from being applied to the aforementioned grid.

The tube 92 comprises a 6AS6 vacuum tube, for example, and is the input tube for generator 34. Generator 34 comprises a cathode coupled bistable multivibrator whose output tube comprises a further pentode 94 with resistor 96 comprising a common cathode resistor for the tubes 92 and 94. Resistors 97–99 in conjunction with a plate resistor 101 for tube 92 coupled to a suitable B+ source of operating potential comprise the grid biasing circuit for tube 94 as well as a coupling circuit between the plate of tube 92 and the control grid of tube 94. The condenser 103 connected across the resistor 97 between the plate of tube 92 and the grid of tube 94 comprises a coupling condenser between tubes 92 and 94. The screen grid and plate of tube 94 are coupled to a suitable B+ source of operating potential by resistors 104 and 106, respectively, the cathode and suppressor grid of the tube being tied together.

The control grid of the pentode tube 92 is coupled to the combining network 26 through capacitor 30 as illustrated in Fig. 3. A D.-C. bias is applied to the control grid of pentode tube 92 from the bias control 36 for setting the level of voltage which is required to trigger generator 34.

The bias control 36 comprises three resistors 106–108 in series between a source of positive potential and ground. An adjustable tap in series with a coupling resistor 109 and the control grid of tube 92 is coupled to a suitable point along resistor 107 for regulating the D.-C. voltage applied to the grid of tube 92.

The circuit components comprising the multivibrator 34 are selected so that during an initial or first state of operation thereof the tube 94 is conducting with the tube 92 non-conducting. Current flow through the common cathode load resistor 96 at this time causes the grid bias of tube 92 to be sufficiently negative so that it is cut off. The position of the adjustable tap along resistor 107 determines the extent that tube 92 is held below cut off while also determining the required amplitude for the triggering voltage supplied to this grid from network 26 to drive the oscillator into second operating state with tube 92 conducting and tube 94 non-conducting. The multivibrator 34 goes back to its first state of operation whenever any triggering voltage pulse at the control grid of tube 92 falls below the required level. Thus, any output pulse F is of a duration corresponding to that of a pulse E.

The suppressor grid of the tube 92 is held at approximately the same potential as its cathode before any signals are applied to multivibrator 34 by a positive D.-C. voltage present at the plate of tube 86 during its quiescent operation. Adjustment of the noise voltage switching level set 91 along resistor 88 regulates the quiescent potential at the plate of tube 86 and effectively determines the magnitude of the noise signal applied to the grid of tube 86 which will lower the aforementioned plate potential to such an extent that it will cut off tube 92, thereby disabling multivibrator 34 from being triggered by an input pulse on its control grid from the combining network. Generally the tube 92 becomes cut off whenever the suppressor grid potential drops negatively relative to the cathode by about five volts, for example. The level set 91 is regulated so that a noise signal above a predetermined minimum will cause the voltage at the plate of tube 86 to drop sufficiently so that the tube 92 becomes cut off and multivibrator 34 disabled.

The multivibrator 34 cannot function to produce the output pulses F when the suppressor grid of tube 92 is operated below cathode potential by an amount as aforedescribed and the indicator circuit 37 cannot be operated for turning on the green lamp thereof. Even though trigger pulses are supplied from the combining network 26 to the control grid of the tube 92, which would otherwise trigger tube 92, the tube will not conduct if a noise voltage signal at the grid of tube 86 is too high. Noise voltage signals of lesser magnitude than a predetermined maximum will lower the plate voltage of tube 86, but not sufficiently for cutting off tube 92.

Utilization of a pentode 92 and control of its suppressor grid voltage for enabling or disabling the tube is a convenient and precise way of controlling the operation of multivibrator 36 as a function of whether or not noise voltage components accompanying the video pulses from the radar receiver 14 are above or below a certain magnitude. Instead of controlling the suppressor grid voltage of tube 92 for such a purpose by a noise signal from tube 82, the signal might be inverted and applied to the cathode of tube 92 for obtaining similar results, the suppressor grid being tied to the cathode of tube 92 during such an operation.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Evaluator apparatus for testing a microwave pulse radar system having a transmitter and receiver, said apparatus comprising: an electromagnetic energy echo box for sampling microwave pulses from the transmitter and reradiating echo pulses back to the receiver for detection thereby, first means responsive to detected energy from the radar receiver for providing a signal whose amplitude level is indicative of radar transmitter-receiver operating performance, second means responsive to detected energy from the radar receiver for providing a signal whose magnitude is a function of the level of noise energy from the radar receiver, and further means coupled to said first and second means for response to said signals for providing a predetermined output whenever the signal provided by said second means is below a predetermined magnitude and the signal provided by said first means is above a predetermined amplitude level.

2. Evaluator apparatus as set forth in claim 1, wherein said second means includes a circuit for suppressing detected signals from the radar receiver while providing an output related to the magnitude of frequency components of noise energy from the receiver at frequencies above those of the detected receiver signals.

3. Evaluator apparatus for testing a pulse radar system having a transmitter, receiver, synchronizer and artificial target, said apparatus comprising: first means for providing a first series of recurrent pulses delayed by a predetermined fixed amount from synchronizing pulses for the radar system, second means for providing a second series of pulses with a predetermined edge of each of said second series of pulses being related in time to a predetermined pulse of said first series in accordance with radar receiver-transmitter performance, third means responsive to a predetermined timing relationship between said first and second series of pulses for producing a combined pulse output above a predetermined amplitude level, fourth means for providing a signal whose magnitude is a function of radar receiver noise level, and further means responsive to a combined pulse output above said predetermined amplitude level from said third means and a signal below a predetermined magnitude from said fourth means for providing a predetermined output indicative of satisfactory radar system performance in response to a test of said radar system.

4. Evaluator apparatus as set forth in claim 3, wherein said fourth means is responsive to detected video pulses from the radar receiver and includes means for suppressing the frequency components of said detected video pulses while passing higher frequency components of noise energy accompanying said video pulses.

5. Evaluator apparatus as set forth in claim 4, wherein said suppressing means comprises a balanced bridge-type circuit for providing a null output in response to frequency components of detected video pulses from the radar receiver while providing a differential output of a magnitude directly related to higher frequency components of noise energy accompanying the detected video pulses.

6. An evaluator for ascertaining the overall operating performance of a pulse radar system including a transmitter, a receiver, an echo box coupled to said transmitter and receiver for providing an artificial target for said radar system and means for producing a series of synchronizing trigger pulses for the radar system, said evaluator comprising: first means for coupling to the radar receiver for providing a voltage pulse for each video pulse output from the receiver with each voltage pulse having a predetermined edge occurring after a time lapse following a synchronizing trigger pulse for the radar system in correspondence with a video output pulse from the receiver, the magnitude of said time lapse being a direct function of receiver gain and transmitter power output, second means for coupling to the radar synchronizing means for providing a series of recurrent test voltage pulses each having a predetermined edge delayed by a predetermined fixed amount from an immediately preceding radar system synchronizing trigger pulse, means coupled to said first and second means for combining the voltage pulses therefrom, discriminating-indicator means coupled to said combining means for providing a first predetermined output in response to a combining means voltage output above a predetermined peak amplitude when said predetermined edges of said voltage pulses provided by said first and second means occur in a predetermined time relation to each other and a second predetermined output when said voltage pulses occur in a different relation, further means for response to the video output pulses of the radar receiver for suppressing frequency components thereof while passing accompanying noise frequency components, and noise monitoring means coupled to said last-named means for generating a signal whose magnitude is a function of the amplitude of said noise components, said discriminator-indicator means being adapted to be disabled by a signal from said noise monitoring means above a predetermined amplitude.

7. An evaluator as set forth in claim 6, further including means coupled to said discriminating-indicator means for adjusting the voltage level required at the output of said combining means for providing said first predetermined output, and further means coupled to said noise monitoring means for adjusting the disabling amplitude level of said noise components.

8. An evaluator as set forth in claim 6, wherein said suppressing means comprises a bridge circuit having a differential output providing a null voltage for frequency components of the video pulses from the radar receiver while providing a differential voltage for noise energy having frequency components above those video pulses, the magnitude of said differential voltage being a direct function of noise energy level.

9. An evaluator as set forth in claim 8, wherein said discriminating-indicator means includes a driven multivibrator having an input tube and an output tube with said input tube having a first input circuit coupled to said combining means for triggering by a combining means voltage output above a predetermined level, said input tube including a second input circuit, and means coupled between said second input circuit and said noise monitoring means for disabling said input tube so as to prevent triggering thereof whenever the amplitude of said noise energy components exceeds a predetermined value.

10. An evaluator as set forth in claim 9, further including means coupled to the first input circuit of said multivibrator for regulating the triggering level thereof, and means coupled to the second input circuit of said multivibrator for regulating the amplitude level of the signal from said noise monitoring means required for disabling said multivibrator.

11. In combination, voltage combining means having first and second inputs, means coupled to said first input for response to a series of video pulse signals accompanied by noise energy components for supplying voltage pulses related to the durations of said pulse signals to said combining means, generating means coupled to said second input for supplying to said combining means test voltage pulses delayed by a predetermined amount from the leading edges of said video pulse signals, said combining means being adapted to provide a voltage output indicative of the timing of the trailing edges of said video pulse signals and said delayed test pulses with said output having a peak amplitude above a predetermined level whenever the trailing edges of said video pulse signals occur later than corresponding test pulses, said output having a peak amplitude below said level at times when said trailing edges of the video pulse occurs prior to said test pulses, discriminator-indicator means coupled to said combining means for providing a first predetermined output at times during said series of video pulse signals when the trailing edges of said video pulse signals occur after the leading edges of said delayed test pulses and a second predetermined output at times during said series of video pulses signals when said trailing edges of said video pulses occur prior to the leading edges of said delayed test pulses, further means for receiving said series of video pulse signals acccompanied by noise energy components for suppressing the frequency components of said series of video pulses while providing a signal related to the magnitude of noise energy components at higher frequencies than the upper frequency components of said video pulse signals, and means coupled between said last-named means and said discriminator-indicator means for disabling said discriminator-indicator means when the magnitude of said signal exceeds a predetermined value.

12. The combination as set forth in claim 11, wherein said suppressing means comprises a bridge circuit for providing balanced null output for frequency components of said video pulse signals and an unbalanced differential output for frequency components of said noise energy.

13. A microwave energy radar system evaluator for testing the operation of a pulse radar system having a transmitter and receiver coupled to an echo box tuned to the carrier frequency of said microwave energy for energization with pulses of microwave energy from said transmitter and retransmission to said receiver as echo energy, said receiver having a video output circuit with said radar system including a synchronizer for producing a series of recurrent synchronizing pulses for said system: said evaluator comprising means for producing a series of recurrent test pulses delayed by a predetermined amount from said recurrent synchronizing pulses for the radar system to be tested, a combining network having first and second inputs with said second input being coupled to said test pulse producing means for receiving voltage pulses therefrom, means coupled to the first input of said combining means for supplying voltage pulses thereto in response to video output signals from the radar system to be tested, each voltage pulse supplied to said first input having an edge delayed in time relative to a corresponding synchronizing pulse for said radar system as a function of radar receiver gain, alignment and transmitter power, amplitude discriminating means coupled to said combining means for response to the combined pulses therefrom when above a predetermined amplitude for providing information that the gain and transmitter power of the radar system to be tested are above predetermined requirements therefor, further means coupled to the video output of the radar receiver for response to noise energy and suppression of the video pulse signal frequency components therefrom, noise energy monitoring means coupled to said last-named means for producing an output proportional to noise level, said discriminating means being coupled to said monitoring means for disablement when the level of said noise energy from said radar receiver rises above predetermined minimum requirements therefor.

14. A radar system evaluator as set forth in claim 13, wherein said amplitude discriminating means comprises a multivibrator having an input side and an output side, said input side comprising a multigrid switch tube having a first input grid coupled to the output of said combining means for triggering of said switch tube and said multivibrator when the amplitude of the voltage from said combining means is above a predetermined level, said switch tube having a second grid coupled to the output of said noise monitoring means for disabling said tube whenever said noise level rises above a predetermined magnitude.

15. A radar system evaluator as set forth in claim 14, further including adjustable means coupled to said noise monitoring means for regulating the level of the output therefrom, and adjustable means coupled to said switch tube for regulating the level of the combining means output voltage supplied to said tube.

16. A radar system evaluator as set forth in claim 15, wherein said noise energy responsive means comprising a balanced four legged bridge circuit, a grid-controlled vacuum tube amplifier having plate and cathode loads of substantially equal impedance values for frequency components of the video output signal from the radar receiver, said plate and cathode loads comprising a pair of adjacent arms of said bridge circuit with the grid of said vacuum tube comprising means for receiving video pulse signals accompanied by noise energy from the radar receiver.

References Cited in the file of this patent

UNITED STATES PATENTS

| | | |
|---|---|---|
| 2,446,244 | Richmond | Aug. 3, 1948 |
| 2,532,539 | Counter | Dec. 5, 1950 |